US012530318B2

(12) United States Patent
Smith et al.

(10) Patent No.: US 12,530,318 B2
(45) Date of Patent: Jan. 20, 2026

(54) GROUPING DATA TO CONSERVE STORAGE CAPACITY

(71) Applicant: HITACHI VANTARA LLC, Santa Clara, CA (US)

(72) Inventors: Jonathan Smith, Bracknell (GB); Mark Leverington, Tilehurst (GB); Simon Crosland, Woking (GB)

(73) Assignee: HITACHI VANTARA LLC, Santa Clara, CA (US)

( * ) Notice: Subject to any disclaimer, the term of this patent is extended or adjusted under 35 U.S.C. 154(b) by 239 days.

(21) Appl. No.: 18/035,137

(22) PCT Filed: Jan. 12, 2021

(86) PCT No.: PCT/US2021/013015
§ 371 (c)(1),
(2) Date: May 3, 2023

(87) PCT Pub. No.: WO2022/154777
PCT Pub. Date: Jul. 21, 2022

(65) Prior Publication Data
US 2023/0409530 A1 Dec. 21, 2023

(51) Int. Cl.
*G06F 16/17* (2019.01)
*G06F 16/16* (2019.01)
*G06F 16/174* (2019.01)

(52) U.S. Cl.
CPC ........ *G06F 16/1727* (2019.01); *G06F 16/164* (2019.01); *G06F 16/1748* (2019.01)

(58) Field of Classification Search
CPC . G06F 16/1727; G06F 16/164; G06F 16/1748
See application file for complete search history.

(56) References Cited

U.S. PATENT DOCUMENTS 9,483,508 B1 * 11/2016 Wilkes .................... G06F 16/22
9,928,250 B2    3/2018 Berrington et al.
(Continued)

FOREIGN PATENT DOCUMENTS

WO    2017/180144 A1    10/2017

OTHER PUBLICATIONS

Extended European Search Report received in corresponding European Application No. 21920001.1 dated Sep. 2, 2024.
(Continued)

*Primary Examiner* — Amy Ng
*Assistant Examiner* — Anthony G Gemignani
(74) *Attorney, Agent, or Firm* — MATTINGLY & MALUR, PC

(57) ABSTRACT

In some examples, a computing device stores root metadata data structures (DSs) together in a group root metadata filesystem block, and stores, in a data filesystem block, at least first file data referenced by the first root metadata DS and second file data referenced by a second root metadata DS. The computing device may determine a reference count of the data filesystem block based on the first file data referenced by the first root metadata DS and the second file data referenced by the second root metadata DS. In addition, the computing device may determine a third file data having content that matches the first file data and referenced by a third root metadata DS. The computing device may update the third root metadata DS to reference the first file data, and update the reference count of the data filesystem block based on updating the third root metadata DS.

20 Claims, 8 Drawing Sheets

(56) References Cited

U.S. PATENT DOCUMENTS

| | | |
|---|---|---|
| 2010/0121825 A1 | 5/2010 | Bates et al. |
| 2013/0111182 A1 | 5/2013 | Aslot et al. |
| 2017/0060432 A1* | 3/2017 | Wang .................... G06F 3/0631 |
| 2018/0285002 A1 | 10/2018 | Hayasaka et al. |
| 2020/0012619 A1* | 1/2020 | Gupta ................. G06F 16/9027 |

OTHER PUBLICATIONS

Japanese Office Action received in corresponding Japanese Application No. 2023-537291 dated Aug. 6, 2024.
International Search Report of PCT/US2021/013015 dated Apr. 2, 2021.

* cited by examiner

GROUPING DATA TO CONSERVE STORAGE CAPACITY

TECHNICAL FIELD

This disclosure relates generally to data storage and, more particularly, to reducing wasted storage capacity in data storage systems.

BACKGROUND

Objects, such as files and the like, may typically include object data and object metadata. For example, the object data includes the content of the object, while the object metadata may include information about the object data and the location of the object data in a filesystem. Further, in a filesystem, object data and metadata may typically be stored in fixed-sized filesystem blocks. Object data for objects larger than a single filesystem block may be divided and stored into multiple filesystem blocks. The location of the filesystem block(s) containing the object data (i.e., data blocks) for a particular object may be pointed to by a form of filesystem metadata created for the object. The filesystem metadata for the object may also be stored in one or more of the fixed-block-size filesystem blocks. Accordingly, the fixed-block-size filesystem may waste storage space whenever a file that is smaller than the fixed-block size is stored in the filesystem. Similarly, the fixed-block-size filesystem may waste space whenever a metadata data structure smaller than the fixed block size is stored in a separate metadata filesystem block.

SUMMARY

Some examples herein include a computing device that may store root metadata data structures (DSs) together in a group root metadata filesystem block, and may store, in a data filesystem block, at least first file data referenced by the first root metadata DS and second file data referenced by a second root metadata DS. The computing device may determine a reference count of the data filesystem block based on the first file data referenced by the first root metadata DS and the second file data referenced by the second root metadata DS. In addition, the computing device may determine a third file data having content that matches the first file data and referenced by a third root metadata DS. The computing device may update the third root metadata DS to reference the first file data, and update the reference count of the data filesystem block based on updating the third root metadata DS.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION OF THE EMBODIMENTS

Some implementations herein may reduce the amount of wasted storage capacity in a fixed-block-size filesystem. For example, the filesystem may employ a reference count in a filesystem free space bitmap to allow data from multiple different small data files to be grouped into a single filesystem block. Similarly, multiple different small metadata data structures (metadata DSs) can be grouped into a single filesystem block. In addition, some examples may group file data with other unrelated file data into a single filesystem block and may group metadata with other unrelated metadata into a single filesystem block. Accordingly, implementations herein may achieve a higher data density than conventional solutions while also enabling the grouped file data to be deduplicated for achieving additional storage capacity conservation.

The examples herein may reduce the amount of wasted space in a filesystem and therefore, may use less overall storage capacity for storing the same amount of data. Furthermore, because fewer filesystem blocks are used, the amount of work that the filesystem performs to find free blocks may be reduced, thereby improving the file serving performance of the filesystem, e.g., effectively improving throughput and reducing latency. In addition, because the amount of used filesystem space is reduced, less data may be written to the underlying storage system used to store the filesystem, which reduces the load on the storage system, and thereby improving the performance of the storage system.

For discussion purposes, some example implementations are described in the environment of one or more computing devices in communication with one or more storages and one or more client devices. However, implementations herein are not limited to the particular examples provided, and may be extended to other types of computing systems, other types of storage environments, other system architectures, and so forth, as will be apparent to those of skill in the art in light of the disclosure herein.

Figure 1:
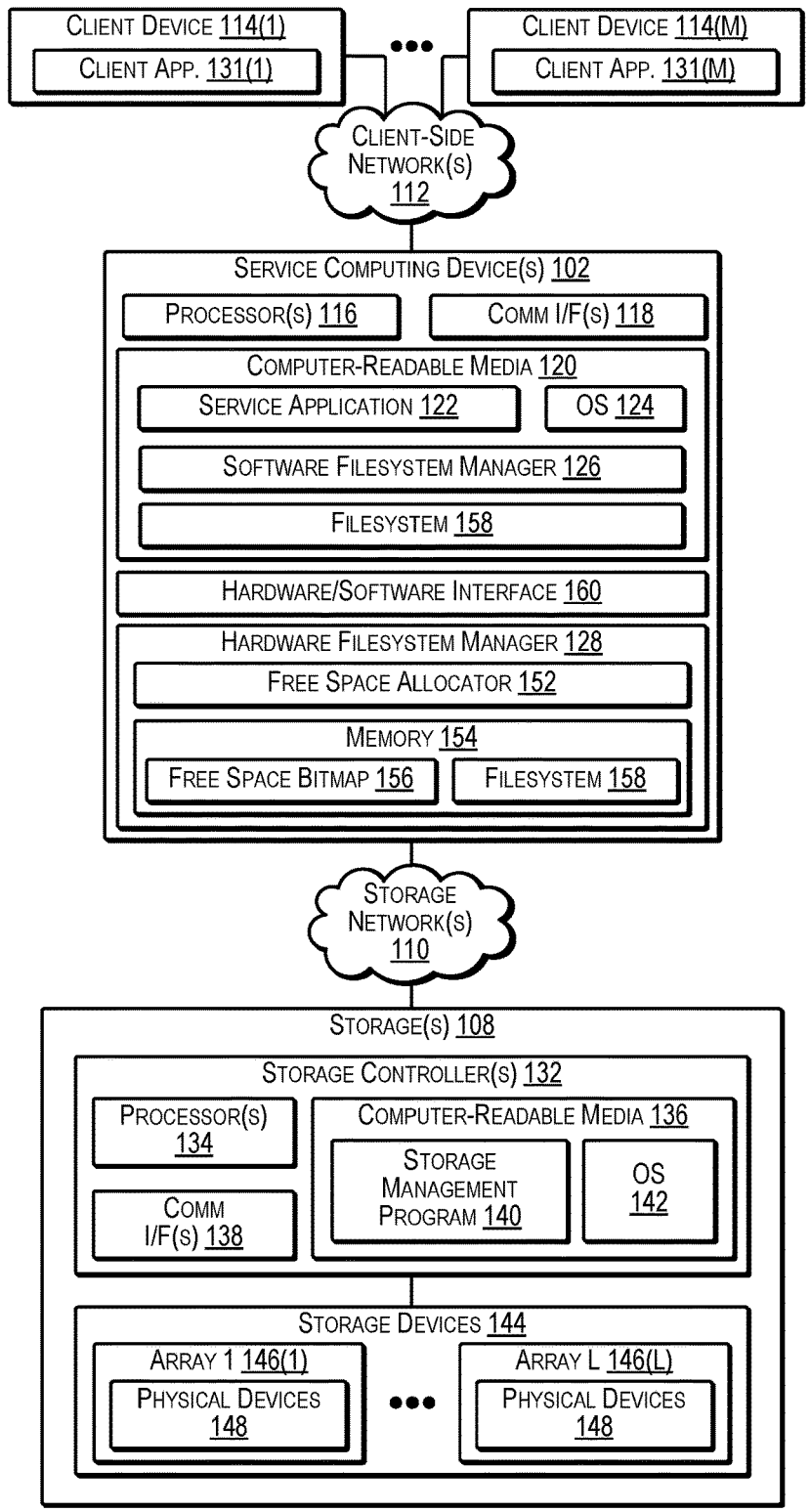
FIG. 1 illustrates an example architecture of a system configured to enable grouping of metadata data structures (metadata DSs) and object data, while also enabling deduplication according to some implementations.

FIG. 1 illustrates an example architecture of a system 100 configured to enable grouping of metadata data structures (metadata DSs) and object data, while also enabling deduplication according to some implementations. The system 100 includes one or more service computing device(s) 102 able to communicate with one or more storages 108. The service computing device(s) 102 may provide processing capacity and storage access to one or more client devices 114. In the case of multiple service computing devices 102, the service computing devices 102 may typically be connected to each other through a private network, high-speed interconnects, and/or other suitable high-speed networking technology (not shown in FIG. 1). For example, the system 100 may allow external access through various front-end protocols that may run on the service computing device(s) 102. The form of access may be through NAS protocols, block protocols, object-based protocols, and/or other standard protocols and/or proprietary protocols.

As illustrated in FIG. 1, the service computing device(s) 102 may be in communication with, or otherwise coupled to the storage(s) 108 through one or more storage networks 110. Further, the service computing device(s) 102 may be able to communicate over one or more client-side networks 112 with the one or more client devices 114, such as user devices or other devices that may access the service computing device(s) 102. Thus, the service computing device(s) 102 may store and manage data for the client devices 114 and may appear to the client devices 114 as a unified storage service.

In some examples, the service computing device(s) 102 may include a plurality of physical servers or other types of computing devices that may be embodied in any number of ways. For instance, in the case of a server, the modules, programs, other functional components, and a portion of data storage may be implemented on the servers, such as in a cluster of servers, e.g., at a server farm or data center, a cloud-hosted computing service, and so forth, although other computer architectures may additionally or alternatively be used. In the illustrated example, each service computing device 102 includes, or may have associated therewith, one or more processors 116, one or more communication interfaces 118, and one or more computer-readable media 120. Further, while a description of one service computing device 102 is provided, the other service computing device(s) 102, if included, may have the same or similar hardware and software configurations and components.

Each processor 116 may be a single processing unit or a number of processing units, and may include single or multiple computing units or multiple processing cores. The processor(s) 116 can be implemented as one or more central processing units, microprocessors, microcomputers, microcontrollers, digital signal processors, state machines, logic circuitries, and/or any devices that manipulate signals based on operational instructions. For instance, the processor(s) 116 may be one or more hardware processors and/or logic circuits of any suitable type specifically programmed or configured to execute the algorithms and processes described herein. The processor(s) 116 can be configured to fetch and execute computer-readable instructions stored in the computer-readable media 120, which can program the processor(s) 116 to perform the functions described herein.

The computer-readable media 120 may include volatile and nonvolatile memory and/or removable and non-removable media implemented in any type of technology for storage of information such as computer-readable instructions, data structures, program modules, or other data. For example, the computer-readable media 120 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 120 may be a tangible non-transitory medium to the extent that, when mentioned, non-transitory computer-readable media exclude media such as energy, carrier signals, electromagnetic waves, and/or signals per se. In some cases, the computer-readable media 120 may be at the same location as the service computing device 102, while in other examples, the computer-readable media 120 may be separate or partially remote from the service computing device 102.

The computer-readable media 120 may be used to store any number of functional components that are executable by the processor(s) 116. In many implementations, these functional components comprise instructions, modules, or programs that are executable by the processor(s) 116 and that, when executed, specifically program the processor(s) 116 to perform the actions attributed herein to the service computing device 102. Functional components stored in the computer-readable media 120 may include a service application 122, an operating system (OS) 124, and a software filesystem manager 126, each of which may include one or more computer programs, applications, executable code, computer-readable instructions, or portions thereof. For example, the software filesystem manager 126 may be a module of the OS 124, a module of the service application 122, or may run independently on top of the OS 124. Furthermore, the service application 122 may be executed by the processors(s) 116 for performing various data processing tasks, such as for interacting with the client devices 114, storing data for the client devices 114 in the storage(s) 108, and/or for providing the client devices 114 with access to the data stored in the storage(s) 108. For instance, the service application 122 may configure the service computing device(s) 102 to provide one or more services that may include namespace management, process management, extent allocation management, lock management, replication/data movement session management, and load balancing. Additionally, the OS 124 may control and manage various functions of the service computing device 102. In addition, the service computing device(s) may include a hardware filesystem manager 128 that interacts with the software filesystem manager 126, and which is described additionally below.

In addition, the computer-readable media 120 may store data and data structures used for performing the functions and services described herein. For example, the computer-readable media 120 may store data, metadata, data structures, and/or other information used by the software filesystem manager 126, the service application 122, and/or the OS 124. The service computing device 102 may also include or maintain other functional components and data, which may include programs, drivers, etc., and other data used or generated by the functional components. Further, the service computing device 102 may include many other logical, programmatic, and physical components, of which those described above are merely examples that are related to the discussion herein.

The communication interface(s) 118 may include one or more interfaces and hardware components for enabling communication with various other devices, such as over the network(s) 110 and 112. Thus, the communication interfaces 118 may include, or may couple to, one or more ports that provide connection to other service computing device(s) 102; connection to the storage network(s) 110 for communicating with the storage(s) 108; and connection to the client-side network(s) 112 for communication with the client devices 114. For example, the communication interface(s) 118 may enable communication through one or more of a LAN (local area network), WAN (wide area network), the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

The storage network(s) 110 and client-side network(s) 112 may include any suitable communication technology, including a WAN, such as the Internet; a LAN, such as an intranet; a wireless network, such as a cellular network, a local wireless network, such as Wi-Fi, and/or a short-range wireless communications, such as BLUETOOTH®; a wired network including Fibre Channel, fiber optics, Ethernet, or any other such network, a direct wired connection, or any combination thereof. As one example, the storage network(s) 110 may employ Fibre Channel technology or other suitable storage networking technology. In addition, as an example, the client-side network(s) 112 may include the Internet, a LAN, a WAN or combination thereof. However, implementations herein are not limited to any particular networking technologies. Thus, the networks 110 and 112 may include wired and/or wireless communication technologies. In addition, the networks 110 and/or 112 may include a storage support network that enables external administrative access to the service computing device(s) 102 via a management computer system, such as may be implemented using one of the client devices 114 or other suitable computing device.

Components used for the networks 110 and 112 can depend at least in part upon the type of network, the environment selected, desired performance, and the like. For instance, one or more of the networks 110 and/or 112 may include forwarding devices, such as switches or sets of switches. As one example, these switches may be Ethernet switches capable of 1 Gb/s, 10 Gb/s, 40 Gb/s, 100 Gb/s, or greater data rates, or any other suitable type of switches. Accordingly, the service computing device(s) 102 are able to communicate with each other, communicate with the storage(s) 108 over the storage network(s) 110, and communicate with the client devices 114 over the client-side network(s) 112 using wired and/or wireless connections, and combinations thereof. Further, in some examples, some or all of the networks 110, 112 may be the same network.

Each client device 114 may be any suitable type of computing device such as a desktop, workstation, server, laptop, tablet computing device, mobile device, smart phone, wearable computing device, or any other type of computing device able to send data over a network. For instance, the client devices 114 may generate data or otherwise provide data that is sent to the service computing device(s) 102 for data storage, backup storage, long term remote storage, or any other sort of data storage. In some cases, the client device(s) 114 may include hardware configurations similar to that described for the service computing device 102, but with different data and functional components to enable the client device(s) 114 to perform the various functions discussed herein. In some cases, a user may be associated with a respective client device 114, such as through a user account, user login credentials, or the like.

Each client device 114(1)-114(M) may access one or more of the service computing device(s) 102 through a respective instance of a client application 131(1)-131(M), such as a browser or other application executed on the client device 114. For instance, the client application 131 may provide a graphic user interface (GUI), a command line interface, and/or may employ an application programming interface (API) for communicating with the service application 122 on a service computing device(s) 102. Furthermore, while one example of a client-server configuration is described herein, numerous other possible variations and applications for the computing system 100 herein will be apparent to those of skill in the art having the benefit of the disclosure herein.

The storage(s) 108 may provide storage capacity for the service computing device(s) 102 for storage of data, such as file data or other object data, and which may include data content and metadata about the content. The storage(s) 108 may include storage arrays such as network attached storage (NAS) systems, storage area network (SAN) systems, or storage virtualization systems. Further, the storage(s) 108 may be co-located with one or more of the service computing device(s) 102, or may be remotely located or otherwise external to the service computing device(s) 102.

In the illustrated example, the storage(s) 108 includes one or more storage computing devices referred to as storage controller(s) 132, which may include one or more servers or any other suitable computing devices, such as any of the examples discussed above with respect to the service computing device(s) 102. The storage controller(s) 132 may each include one or more processors 134, one or more computer-readable media 136, and one or more communication interfaces 138. For example, the processor(s) 134 may correspond to any of the examples discussed above with respect to the processors 116, the computer-readable media 136 may correspond to any of the examples discussed above with respect to the computer-readable media 120, and the communication interfaces 138 may correspond to any of the examples discussed above with respect to the communication interfaces 118.

Further, the computer-readable media 136 of the storage controller 132 may be used to store any number of functional components that are executable by the processor(s) 134. In many implementations, these functional components comprise instructions, modules, or programs that are executable by the processor(s) 134 and that, when executed, specifically program the processor(s) 134 to perform the actions attributed herein to the storage controller 132. Functional components stored in the computer-readable media 136 may include a storage management program 140 and an OS 142, each of which may include one or more computer programs, applications, executable code, computer-readable instructions, or portions thereof. For example, the storage management program 140 may control or otherwise manage the storage of the data in a plurality of storage devices 144 coupled to the storage controller 132. The OS 142 may control and manage various functions of the storage controller 132.

In addition, the storage devices 144 may, in some cases, include one or more arrays 146(1)-146(L) of physical storage devices 148. For instance, the storage controller 132 may control one or more arrays 146, such as for configuring the arrays in a RAID (redundant array of independent disks) configuration or other desired storage configuration. The storage controller 132 may present logical units based on the physical devices to the service computing device(s) 102, and may manage the data stored on the underlying physical devices 148. The physical devices 148 may be any type of storage device, such as hard disk drives, solid state devices, optical devices, magnetic tape, and so forth, or combinations thereof. In some examples, the storage(s) 108 may include thin-provisioning capability configured to provide on-demand storage capacity, may include failover protection, automated replication, backup, archiving, or the like. Alternatively, in other examples, one or more of the service computing device(s) 102 may act as the storage controller, and the storage controller 132 may be eliminated.

In the illustrated example, the service computing device(s) 102 and storage(s) 108 are configured to act as a data storage system 150 for the client devices 114. The filesystem blocks herein may each be a unit of storage that correspond to a portion of physical storage in the storage storage(s) 108. The service application 122 on the service computing device(s) 102 may be executed to receive and store data from the client devices 114 on the storage(s) 108 and/or subsequently retrieve the data from the storage(s) 108 and provide the data to the client devices 114. The data storage system 150 may be scalable to increase or decrease the number of service computing device(s) 102 and/or storages 108, as desired, for providing a particular operational environment. For example, the performance of the storage system 150 may scale in substantially a linear fashion as service computing device(s) 102 are added. The amount of storage capacity included within the storage(s) 108 can also be scaled as desired. In some implementations, the storage(s) 108 may be scaled to multiple petabytes or more of data storage space.

Further, the service computing device(s) 102 and the client devices 114 may include any number of distinct computer systems, and implementations disclosed herein are not limited to a particular number of computer systems or a particular hardware configuration. In addition, for increased fault tolerance, the communication interfaces 118 of the service computing device(s) 102 may include redundant network connections to each of the networks to which the service computing device(s) 102 are coupled. Further, in some cases, a multi-file server architecture of the data storage system 150 may provide for fault tolerance and file server fail over. For example, should one of service computing device(s) 102 fail, one or more of the other service computing device(s) 102 may be configured to detect the failure and automatically perform one or more processes previously executed by the failed service computing device 102 until a suitable replacement is deployed and operational. In addition, at least some of the components disclosed herein may continue to function uninterrupted despite the failure of other ones of the service computing device(s) 102.

In some examples, each of the service computing device(s) 102 includes the service application 122, the software filesystem manager 126, the hardware filesystem manager 128, and/or other executable code and data structures, configured to cause the data storage system 150 to perform the storage allocation and deduplication described herein. For example, the hardware filesystem manager 128 may include a free space allocator 152 and a memory 154. For instance, the memory 154 may typically contain a free space bitmap 156 and at least a portion of a filesystem 158. For example, the filesystem 158 may be stored persistently in the computer-readable media 120, and loaded into cache in the memory 154 during operation of the hardware filesystem manager 128. The free space bitmap 156 may be a series of bits in which respective sets of bits in the bitmap 156 each correspond to a particular respective filesystem block in the filesystem 158. As one example, the bitmap 156 may include a set of 8 bits per filesystem block, and the 8 bits may be used to indicate how many metadata DSs are grouped together and stored in the same particular filesystem block or how many small (i.e., smaller than the fixed block size) data files are stored in the particular filesystem block.

In addition, the number of bits in the free space bitmap 156 is finite, so there is a maximum number of references that a block can have. If deduplication was to be performed and then data was to be grouped into blocks afterwards, then the deduplication process may have made the reference count reach its maximum value. That would mean that the filesystem block could not then group anything else into that filesystem block and data grouping would fail. Similarly, if the deduplication process made the reference count very close to its maximum value, then not much else could be grouped into that filesystem block and the data grouping would only partially succeed. However, some implementations herein may always perform the grouping in the file system blocks first, so that the grouping will always succeed and deduplication will always succeed.

As one example, the free space allocator 152 may include one or more hardware components, such as one or more field-programmable gate arrays (FPGAs). For instance, the FPGA(s) may be configured using a hardware description language (HDL) to perform the operations described herein. In some examples, the FPGA(s) may contain an array of programmable logic blocks that are configured by the HDL to perform at least a portion of the algorithms discussed herein in cooperation with the software filesystem manager 126. Accordingly, the service computing device(s) 102 may perform space allocation through a division of processing between the software filesystem manager 126 and the hardware filesystem manager 128. The software filesystem manager 126 includes various software components that run under the operating system 124. The hardware filesystem manager 128 includes a free space allocator 152 that is configured to use the free space bitmap 156 for allocating filesystem blocks for storage of metadata and file data. A hardware/software interface 160 may be provided to allow for communication between the software filesystem manager 126 and the hardware filesystem manager 128.

The software filesystem manager 126 may direct block allocation and deduplication functions in the background so as to control the impact that the block allocation and deduplication has on the performance of the hardware filesystem manager 128. Both the software filesystem manager 126 and the hardware filesystem manager 128 may include various optimizations for reducing the amount of processing and communication required to perform the block allocation and deduplication discussed below. In some examples, the filesystem 158 may be configured to include a reference count in the free space bitmap 156 to allow data from multiple different small data files (e.g., smaller than the fixed size of a filesystem block) to be grouped into a single filesystem block. Similarly, multiple different metadata data structures (metadata DSs) can be grouped into a single filesystem block. In addition, some examples may group file data with other unrelated file data into a single filesystem block and may group metadata with other unrelated metadata into a single filesystem block. For example, a reference count in the filesystem free space bitmap 156 may be used in order to allow data from multiple different small files to be grouped into a single filesystem block.

Similarly, multiple different metadata structures (e.g., root metadata DSs and intermediate metadata DSs) can be grouped into a single filesystem block. In addition, file data may be grouped with file data and metadata may be grouped with metadata of the same type, which may provide a higher block storage density, while also enabling the grouped file data can be deduplicated using a reference count. Consequently, as discussed additionally below, the techniques and arrangements herein may achieve a substantial conservation of storage capacity.

The data storage system 150 is not limited to the particular configuration illustrated in FIG. 1. This configuration is included for the purposes of illustration only. Various examples herein utilize a variety of hardware components, software components, and combinations of hardware and software components that are configured to perform the processes and functions described herein. In addition, in some examples, some of the hardware components described above may be virtualized. For example, some or all of the service computing device(s) 102 may include virtual machines operating on the one or more hardware processors 116 or portions thereof. Numerous other hardware and software configurations will be apparent to those of skill in the art having the benefit of the disclosure herein. Thus, the scope of the examples disclosed herein is not limited to a particular set of hardware, software, or a combination thereof.

Figure 2:
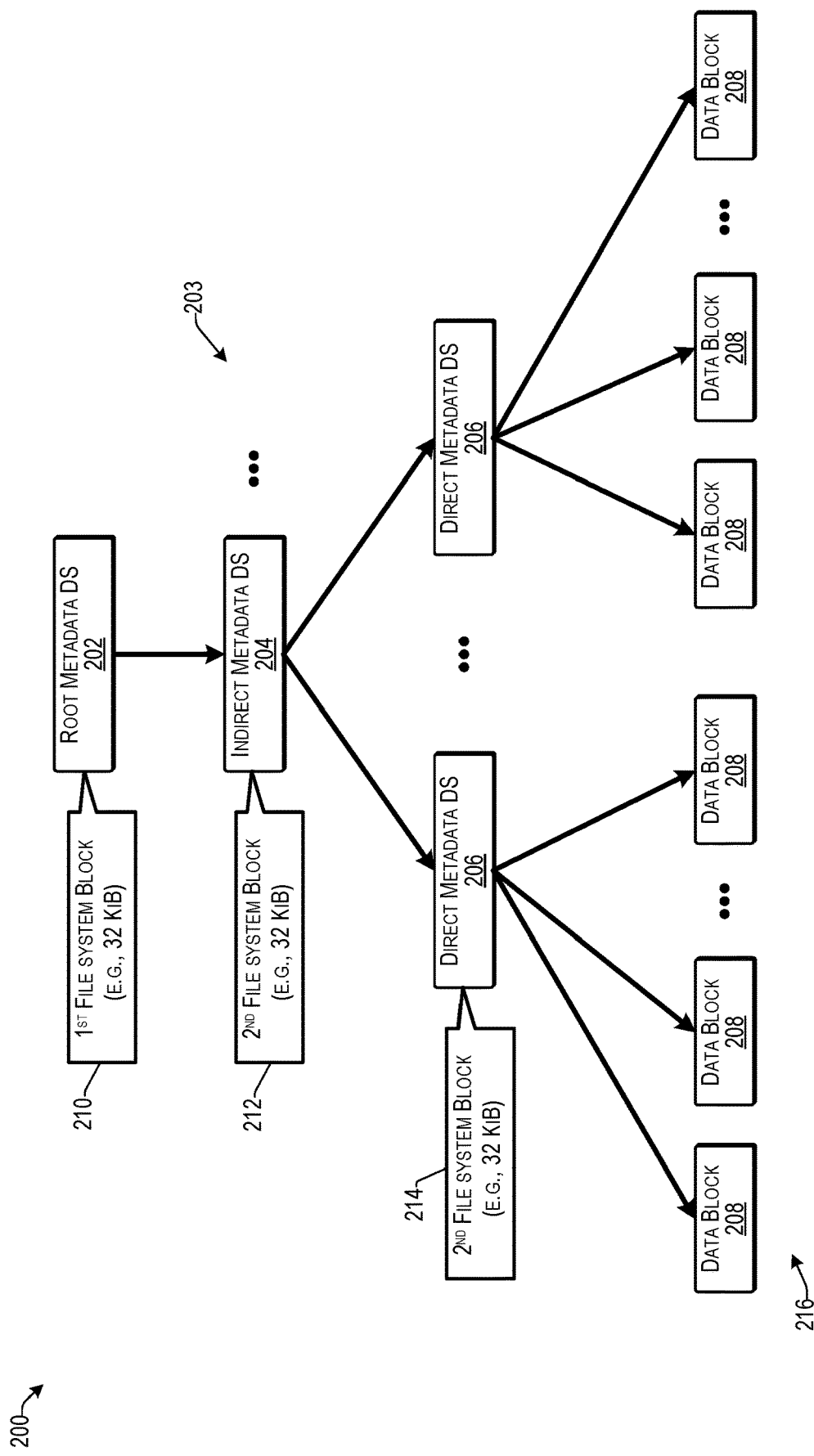
FIG. 2 illustrates an example format of an object tree structure according to some implementation.

FIG. 2 illustrates an example format of an object tree structure 200 according to some implementation. The service computing device(s) 102 may store various types of objects in the filesystem 158. The objects may be classified generally as file objects and system objects. File objects may be created for storage of user data and associated attributes, such as text files, image files, multimedia files, and so forth. System objects may be created for the filesystem 158 for managing information. In the examples herein, the filesystem 158 may be managed using tree structures 200 created for each stored object. For instance, a root metadata DS 202 (which may also be referred to as a "root node") may include a pointer that points directly to a file data block or that points to one or more intermediate metadata DSs 203, at least one of which does point directly to the file data blocks.

Each object stored in the filesystem 158 may be stored using a separate tree structure 200 that includes a separate root metadata DS 202. In the example of FIG. 2, a root metadata DS 202 points to intermediate metadata DSs 203, which may be indirect metadata DSs 204 or direct metadata DSs 206. In this example, the root metadata DSs 202 points to one or more indirect metadata DSs 204, each of which may point to one or more direct metadata DSs 206. The direct metadata DSs 206 point directly to data blocks 208 that store the object data.

For example, depending on the size of the data being stored, the tree structure 200 may include one or more intermediate metadata DSs 203 that may be either direct metadata DSs 206 that point directly to file data blocks 208, or indirect metadata DSs 204 that point to either direct metadata DSs 206 or other indirect metadata DSs 204. If indirect metadata DSs 204 are used, the root metadata DS 202 includes a pointer to the indirect metadata DS(s) 204. The indirect metadata DS(s) 204 may include pointers to other indirect metadata DSs 204 or to direct metadata DSs 206.

The direct metadata DSs 206 point to a plurality of data blocks 208. In practice, object tree structures 200 can vary widely depending on the size of the object being stored. Also, the tree structure 200 of a particular object can vary over time as data is added to or deleted from the object. For example, intermediate metadata DSs 203, and data blocks 208 may be dynamically added to the tree structure 200 as more storage space is used for storing the object data, and multiple levels of indirect metadata DSs 204 may be used as needed as the tree 200 expands.

As one example, suppose that a root metadata DS 202 has predetermined size, such as a fixed number of bytes (e.g., 256, 512, 1024, etc.). The root metadata DS 202 may include various metadata such as information about the object, and may also include filesystem storage location information. In this example, suppose that the fixed size of the root metadata DS 202 allows the root metadata DS 202 to point to a maximum of 16 data blocks 208 of the object data.

When the object data for an object includes more than 16 data blocks, one or more direct metadata DSs 206 may be used to point directly to the data blocks 208, and the root metadata DS 202 may point to the direct metadata DS(s) 206 or to indirect metadata DS(s) 204 if indirect DS(s) 204 are used. In some cases, the direct and indirect DSs 206 and 204 may be of a fixed size that is larger in size than the root metadata DS 202. For instance, if the root metadata DS is 512 bytes, the direct metadata DSs 206 and indirect metadata DSs 204 may be 1024 bytes, and thus, the direct metadata DSs 206 may be able to point to a larger number of data blocks 208 than the root metadata DS 202. As one example, each direct metadata DS may be able to point to, e.g., 60 data blocks 208, and each indirect metadata DSs 204 may be able to point to, e.g., 60 direct metadata DSs 206, or a combination of direct metadata DSs 206 and data blocks 208 that total 60. For instance, the root metadata DSs may include additional metadata that is not included in the direct and indirect metadata DSs, so the direct and indirect metadata DSs that are twice the size of the root metadata DSs may be able to store more than twice as many pointers as the root metadata DSs. Thus, the filesystem 158 herein may use different fixed sizes of metadata DSs that together may form the tree 200 of metadata for providing storage location information for storage of a data object.

When an object is to be stored, the root metadata DS 202 may be initially created for the object. The root metadata DS 202 of such an "empty" object has no pointers to any intermediate metadata DSs 203 (i.e., the indirect metadata DSs 204 or the direct metadata DSs 206) or to the data blocks 208. As file data is stored for the object, the file data may be initially put into file data blocks 208 pointed to directly from the root metadata DS 202. Once all the direct block pointers in the root metadata DS 202 are filled, if there is still data to be stored, then one or more intermediate metadata DSs 203 may be created with a pointer from the root metadata DS to the intermediate metadata DS(s) 203.

A conventional fixed-block-size filesystem may waste storage space whenever file data that is smaller than the fixed-block size is stored in the filesystem. Similarly, a conventional fixed-block-size filesystem may waste space whenever a metadata DS for an object is stored in the filesystem if the metadata DS is smaller than the fixed-block size. Accordingly, implementations herein include an arrangement and method to reduce the amount of this wasted space. As one example, the metadata DSs herein (i.e., the root metadata DSs 202 and the intermediate metadata DSs 203) may be of different fixed sizes that are selected such that the fixed-block size of the filesystem 158 is a multiple of the metadata DSs, i.e., the filesystem fixed block size is a multiple of the root metadata DS size and a different multiple of the intermediate metadata DS size. For instance, as an example, if the root metadata DS 202 is half the size of an intermediate metadata DSs 203, twice as many root metadata DSs 202 may fit into a single filesystem block as intermediate metadata DSs 203.

In some cases, both the root metadata DS 202 and the intermediate metadata DS 203 may be sized so that a certain number of each metadata DSs 202, 203 can fit into the fixed size filesystem block without wasting space. For instance if the filesystem block size is 32 KiB, then the root metadata DSs 200 may be specified to be of a size such that 64 root metadata DSs fit into the filesystem block without wasting space, and the intermediate metadata DSs 203 may be specified to be of a size larger than the root metadata DSs, e.g., such that 32 intermediate metadata DSs 203 may fit into a single filesystem block without wasting space. Further, in some examples, the indirect metadata DSs 204 may be of a different size from the direct metadata DSs 206, but both may be specified to be of size such that the total fixed block size is a multiple of the size of the indirect metadata DS and the direct metadata DS.

In the example of FIG. 2, as indicated at 210, the root metadata DS 202 may be grouped with other root metadata DSs (not shown in FIG. 2) into a first filesystem block, such as a 32 kilobyte block. Furthermore, as indicated at 212 and 214, respectively, the indirect metadata data structures 204 and the direct metadata data structures 206 may be grouped into a second filesystem block with other intermediate metadata DSs (not shown in FIG. 2). In addition, in this example, as indicated at 216, the object data extends over a plurality of filesystem data blocks 208, and is divide among the plurality of data blocks such that each of the data blocks 208 may correspond to one filesystem block, with the final data block 208 likely only being partially filled with data.

Figure 3:
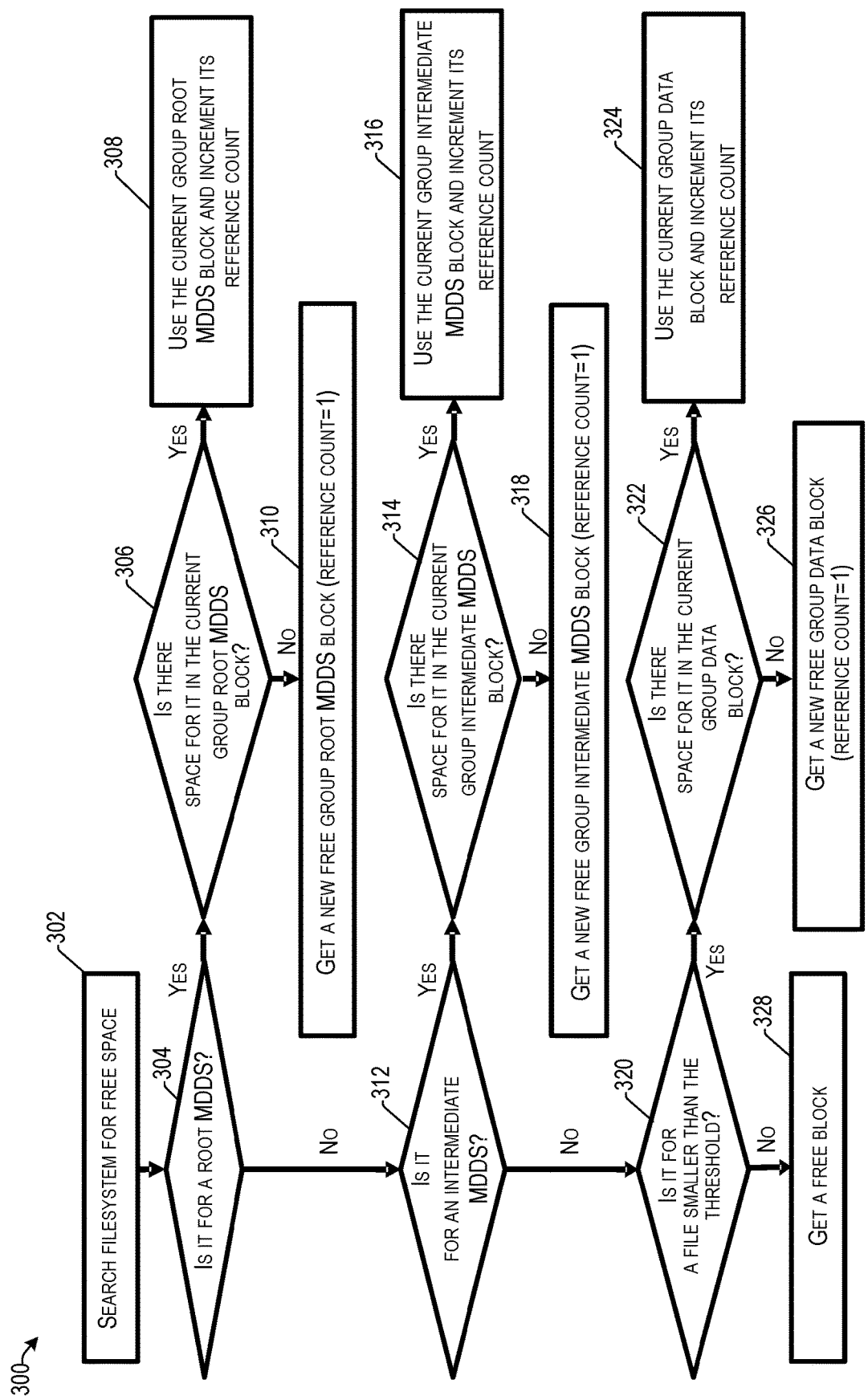
FIG. 3 is a flow diagram illustrating an example process for allocating storage according to some implementations.
Figure 4:
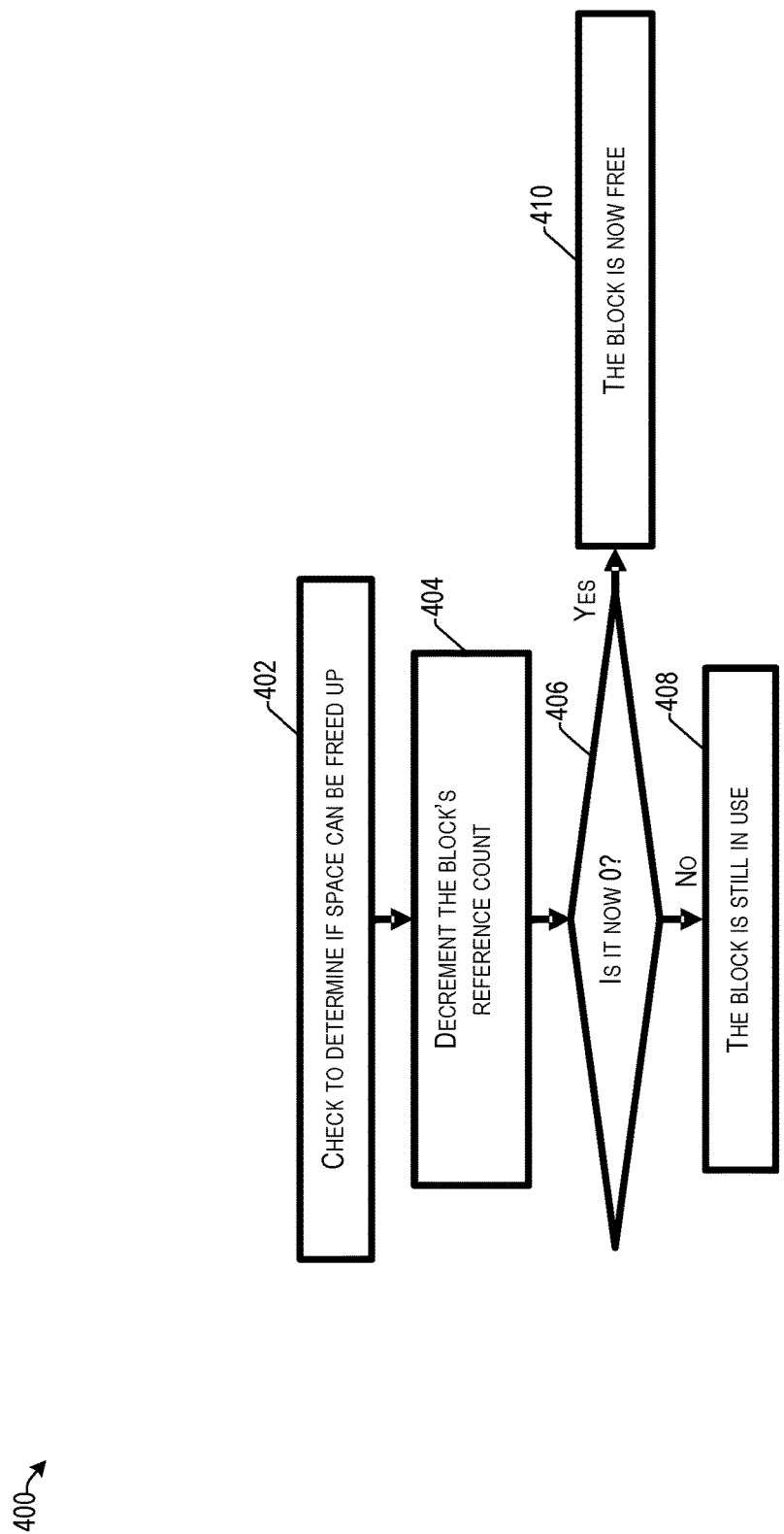
FIG. 4 illustrates an example process for freeing storage according to some implementations.

FIGS. 3 and 4 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems, and devices described in the examples herein, although the processes may be implemented in a wide variety of other environments, systems, and devices.

FIG. 3 is a flow diagram illustrating an example process 300 for allocating storage according to some implementations. In some examples, the process may be executed at least partially by the free space allocator 152 of the hardware filesystem manager 128 in communication with the software filesystem manager 126 executed by the one or more processors 116 of the service computing device(s) 102, or the like.

At 302, the free space allocator 152 may search the filesystem for free space to store data. For instance, the process 300 may be executed upon receiving a write request to search for space to store received data. For example, a metadata data structure and/or file data may need to be stored in the filesystem 158. Alternatively, the process may be initiated manually by an administrator, or automatically, such as periodically for determining if space can be freed up. For performing the process 300, the free space allocator 152 may traverse the free space bitmap 156 discussed above with respect to FIG. 1.

At 304, the free space allocator 152 may determine whether the process is being performed for storing a root metadata DS. If so, the process goes to 306. If not, the process goes to 312.

At 306, if the process is being performed for a root metadata DS, the free space allocator 152 may determine whether there is space for the root metadata DS in an existing group root metadata DS (MDDS) filesystem block, namely, an existing filesystem block having one or more root metadata DSs already stored therein. If so, the process goes to 308. If not, the process goes to 310.

At 308, if there is an existing group root metadata DS filesystem block with sufficient space, the computing device stores the root metadata DS in the existing root metadata DS filesystem block and increments the reference count of the existing group root metadata DS filesystem block by one. As mentioned above, the reference count may be determined from and incremented in the free space bitmap 156, and may indicate how many root metadata DS are stored in the existing group root metadata DS filesystem block, with the maximum being based on the predetermined size of the root metadata DS and the fixed size of the filesystem blocks.

At 310, on the other hand, if there is no existing group root metadata DS filesystem block that has sufficient space, the free space allocator 152 may obtain a free filesystem block to create a new group root metadata DS filesystem block, stores the root metadata DS into the new group root metadata DS filesystem block, and sets the reference count for that block to 1.

At 312, if the process is not being performed for a root metadata DS, the free space allocator 152 may determine whether the process is being performed for an intermediate metadata DS.

At 314, if the process is being performed for an intermediate metadata DS, the free space allocator 152 may check the free space bitmap 156 to determine whether there is space for the intermediate metadata DS in an existing group intermediate metadata DS filesystem block, namely an existing filesystem block having one or more direct/indirect metadata DSs.

At 316, if there is an existing group intermediate metadata DS filesystem block with sufficient space, the computing device stores the intermediate metadata DS in the existing group intermediate metadata DS filesystem block and increments the reference count of the existing group intermediate metadata DS filesystem block by one.

At 318, on the other hand, if there is no existing group intermediate metadata DS filesystem block that has sufficient space, the computing device obtains a free block to create a new group intermediate metadata DS filesystem block, stores the intermediate metadata DS into the new free intermediate metadata DS filesystem block, and sets the reference count for that block to 1.

At 320, if the process is not being performed for a root metadata DS or an intermediate metadata DS, the free space allocator 152 may determine whether the process is being performed for file data that does not exceed a threshold size. For example, the threshold size may be at least smaller than the fixed block size of the filesystem blocks. The determination of whether a file data is of a predetermined size may be based on a preset size threshold that may be less than the fixed block size of the filesystem blocks, such as one half the size of a filesystem block or less to make it worthwhile to group file data from multiple different files in the same filesystem block. If so, the process goes to 322. If not, the process goes to 328.

At 322, if the file data size is less than the threshold, the free space allocator 152 may determine whether there is space for the file data in an existing group file data filesystem block, namely an existing filesystem block having data for one or more other files stored therein.

At 324, if there is an existing group file data filesystem block with sufficient space, the free space allocator 152 may store the file data in the existing group file data filesystem block and increment the reference count of the existing file data filesystem block by one.

At 326, on the other hand, if there is no existing group file data filesystem block that has sufficient space, the free space allocator 152 may obtain a free filesystem block to create a new group file data filesystem block, stores the file data into the new group file data filesystem block, and sets the reference count for that block to 1.

At 328, on the other hand, if the file data is not smaller than a threshold size, then the free space allocator 152 may obtain a free filesystem block to use to store the file data.

FIG. 4 illustrates an example process 400 for freeing storage according to some implementations. In some examples, the process 400 may be executed at least partially by the free space allocator 152 of the hardware filesystem manager 128 in communication with the software filesystem manager 126 executed by the one or more processors 116 of the service computing device(s) 102, or the like.

At 402, the free space allocator 152 may start the process to determine whether space can be freed up, such as based on deletion of a file from the file system.

At 404, after starting the process to free up space, the free space allocator 152 may decrement a particular filesystem block's reference count, such as due to no longer being pointed to by another block, e.g., due to deletion of a root metadata DS and/or intermediate metadata DS.

At 406, the free space allocator 152 may determine if the reference count for the particular filesystem block is now zero. If so, the process goes to 410. If not, the process goes to 408.

At 408, if the reference count is not zero, the block is still in use and therefore is not indicated as being free.

At 410, if the reference count is zero, the block is indicated as being free, such as by updating the free space bitmap for the particular block and/or adding the block to a free block list and/or adding the block to a pool of available filesystem blocks, or the like.

As mentioned above, to manage the free space, the filesystem may use the free space bitmap 156. In some examples, the filesystem herein may use 8 bits to represent the state of each filesystem block, which may also be used for deduplication of the file data. Certain values of the 8 bits may be used to indicate how many references there are to a block containing data that has been deduplicated (i.e., all duplicates of the data have been discarded and a single common block remains). This is known as the reference count. The reference count for a block that contains data may be between 1 (i.e., there is 1 reference to the block in the filesystem) and some maximum value. Attempts to deduplicate a block beyond the maximum value may result in a new block being used and then being deduplicated against.

In implementations herein, the same 8-bit values are also used to indicate how many metadata DSs are grouped together in a group root metadata DS filesystem block and/or a group intermediate metadata DS filesystem block. For example, if root metadata DSs are 512 bytes, then up to 64 root metadata DSs may be grouped together into a single 32 kB filesystem block. Similarly, if intermediate metadata DSs are 1024 Bytes, for example, then up to 32 intermediate metadata DSs may be grouped together into a single 32 kB filesystem block.

Figure 5:
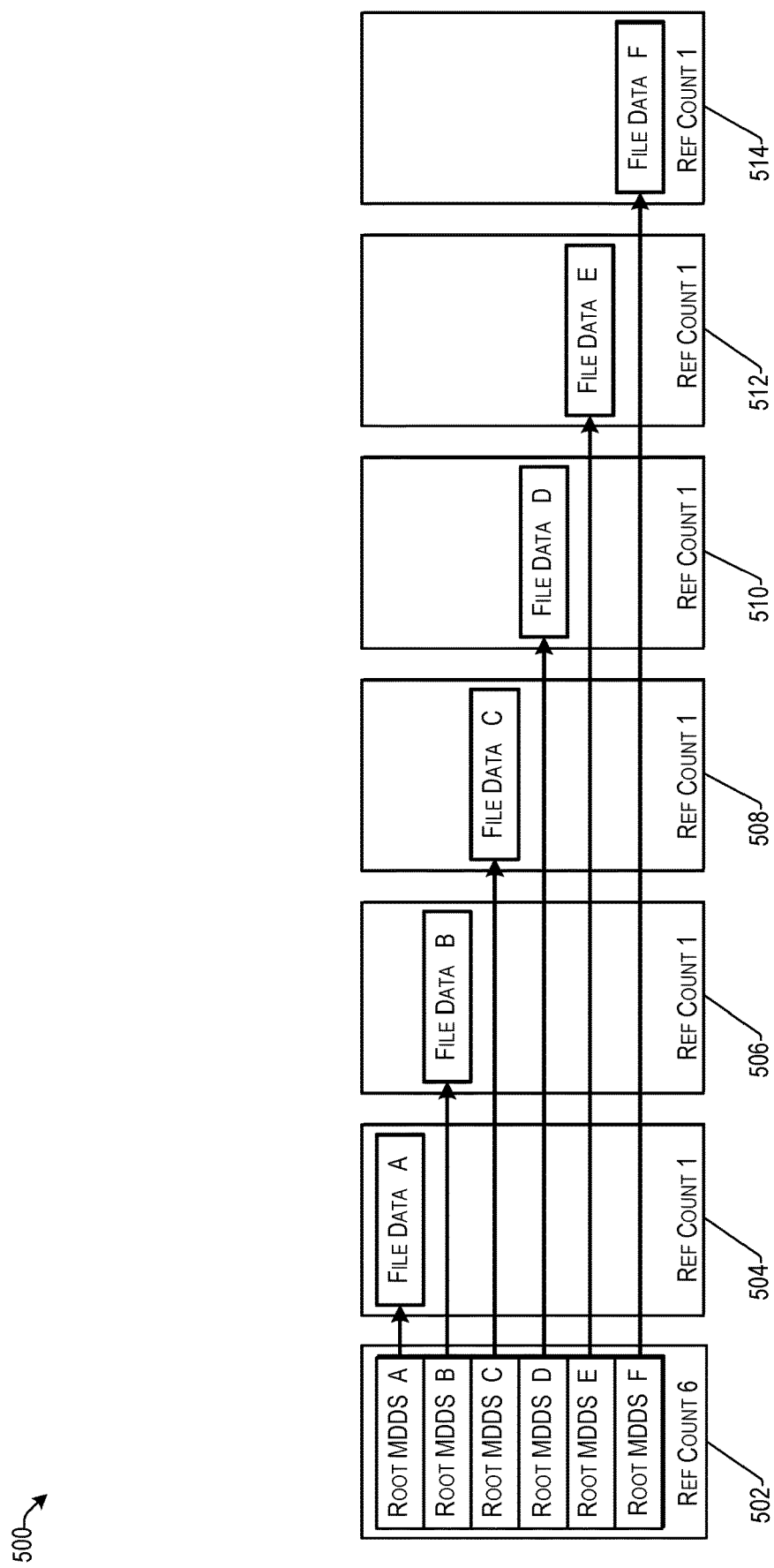
FIG. 5 illustrates an example of conserving storage capacity based on grouping of stored data according to some implementations.

FIG. 5 illustrates an example 500 of conserving storage capacity based on grouping of stored data according to some implementations. In FIG. 5, a plurality of filesystem blocks 502-514 are illustrated. Filesystem block 502 contains six root metadata DSs A, B, C, D, E, and F that are grouped together and stored in the same group filesystem block 502. The root metadata DSs correspond to six different file objects A, B, C, D, E, and F, that include six different file data, namely, file data A, file data B, file data C, file data E, and file data F, respectively. The reference count for filesystem block 502 is six (6). Filesystem blocks 504-514 each store one file data pointed to, or otherwise referenced by, a respective one of the six root metadata DSs A-F stored in the filesystem block 502. As each of the filesystem blocks 504-514 each store only one file data then the reference count for each of filesystem blocks 504-514 is one (1), as illustrated. For example, filesystem block 504 stores file data A pointed to by the root metadata DS A in filesystem block 502; filesystem block 506 stores file data B pointed to by the root metadata DS B in filesystem block 502; filesystem block 508 stores file data C pointed to by root metadata DS C in filesystem block 502; filesystem block 510 stores file data D pointed to by root metadata DS D in filesystem block 502; filesystem block 512 stores file data E pointed to by root metadata DS E in filesystem block 502; and filesystem block 514 stores file data F pointed to by root metadata DS F in filesystem block 502.

As discussed above, in some implementations, 8 bit values in the free space bitmap 156 may be used for each filesystem block to indicate how many pieces of data are grouped together in that filesystem block. For instance, if a filesystem block pointer has a granularity of 512 Bytes, then the pointer is sized to be able to point to blocks with a resolution/granularity of 512 Bytes. For example, a smaller block granularity would require pointers to be of a larger size, which would take up more space in each root or intermediate metadata DS. In addition, if the block pointer granularity is 512 Bytes, and if the block size in the filesystem is 32 kB, then up to 64 pieces of data (each up to 512 bytes in size), may be grouped together in a single filesystem block. These pieces of data may either be for up to 64 files (where each file data is up to 512 Bytes in length), or for a smaller number of larger files (where each is less than a filesystem block size in length), or for any combination up to 32 kB in total.

Since data may be grouped together as the filesystem block is allocated, deduplication can be performed afterwards, independently of the data grouping. Alternatively, deduplication, as discussed below, could be performed before allocation, meaning that duplicate data would not need to be grouped with other data. Alternatively, even if deduplication is not performed the saving of storage space is still realized by grouping of the data into a smaller number of filesystem blocks.

Figure 6:
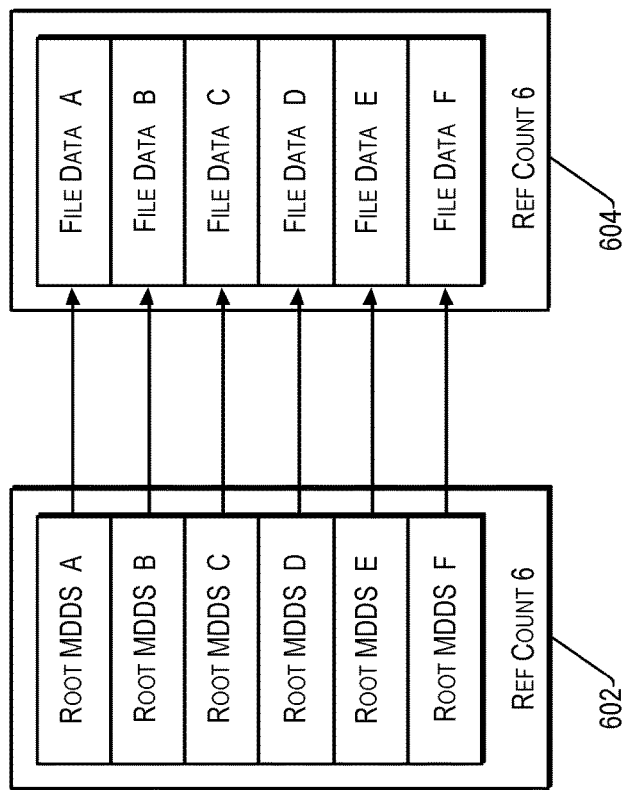
FIG. 6 illustrates an example of conserving storage capacity based on grouping of metadata DSs and data according to some implementations.

FIG. 6 illustrates an example 600 of conserving storage capacity based on grouping of metadata DSs and data according to some implementations. In FIG. 6, filesystem block 602 has six root metadata DSs A-F grouped together for six different file data A-F, similar to the example of FIG. 5 discussed above. Meanwhile, filesystem block 604 has the six different corresponding file data A-F grouped together and pointed to by the respective root metadata DS A-F. In this example, by grouping root metadata DSs with other root metadata DSs, no space would be wasted by the root metadata DSs once the filesystem block 602 is completely filled with root metadata DSs, provided that the filesystem fixed block size is a multiple of the fixed size of the root metadata DS.

In addition, in this example, each of the file data A-F is smaller than the threshold size discussed above with respect to FIG. 3 at 320, and each of the file data A-F are sufficiently small to accommodate at least these six file data A-F in a single filesystem block 604. Accordingly, the reference count for filesystem block 604 is six (6). The file data A-F may be of variable size. Accordingly, the process of FIG. 3 may be executed to determine whether any additional file data may be added to the file system block 604.

In this example, suppose that the block 604 is only partially filled. Accordingly, the system may add another file data to the block 604 if a file data that fits within the remaining space in the block 604 is in need of storage. For example, based on the process 300 of FIG. 3 discussed above, a new block will be used if a new piece of file data does not fit in the space remaining in block 604 because the new piece of file data will not be "split" in implementations herein. Nevertheless, if the new piece of file data is of a size that is less that the filesystem block size, then the partially-filled block 604 may be left as is and the new block may be used instead for attempting to store subsequent file data until such time as the new block becomes too full to fit a new data segments. Alternatively, the new block may be used for the new piece of file data, but might not be used for grouping subsequent file data, and instead the existing partially-filled block 604 may continue to be used. As still another example, the system may attempt to fill both block 604 and the new block, depending on the amount of available space in each. Accordingly, implementations herein may dynamically decide, based on which option saves the most space, which option to use for each and every data segment, in order to group file data most efficiently.

Figure 7:
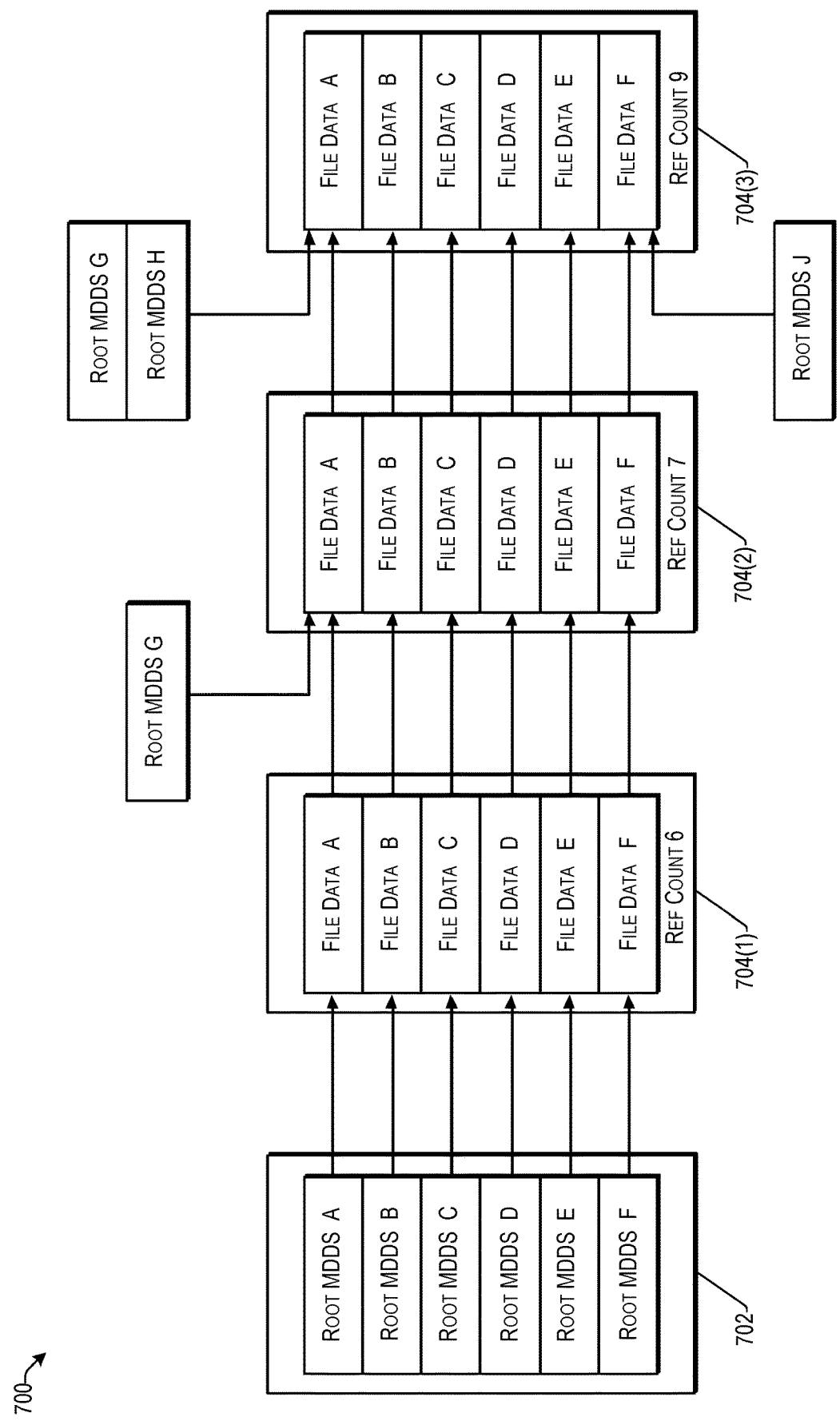
FIG. 7 illustrates an example including deduplication of grouped data according to some implementations.

FIG. 7 illustrates an example 700 including deduplication of grouped data according to some implementations. In FIG. 7, filesystem block 702 has six root metadata DSs A-F grouped together for six different objects and six corresponding different file data A-F, similar to the example of FIG. 6 discussed above. Furthermore, filesystem block 704 (1), at a first point in time, has the six different corresponding file data A-F grouped together and pointed to by the respective root metadata DS A-F. In this example, by grouping root metadata DSs with other root metadata DSs, no space would be wasted by the root metadata DSs once the filesystem block 702 is completely filled with root metadata DSs, provided that the filesystem fixed block size is a multiple of the fixed size of the root metadata DS.

In this example, filesystem block 704(1) at the first point in time has a reference count of six (6). At a second point in time, as illustrated at 704(2), suppose that file data A is identical to file data G included in another object G that has been stored at another file system block (not shown in FIG. 7) and pointed to by another root metadata DS G. Accordingly, rather than keeping the identical data in the other filesystem block, the file data G can be deduplicated such that the file data A in filesystem block 704(2) is also pointed to by the root metadata DS G. Based on this additional pointer, the reference count of filesystem block 704(2) is increased to seven (7) at the second point in time.

Similarly, at a third point in time, as indicated at 704(3), suppose file data A is identical to file data H included in another object H that has been stored at another file system block (not shown in FIG. 7) and pointed to by another root metadata DS H, the reference count may again be increased. Further, suppose file data F is identical to file data J included in another object J that has been stored at another file system block (not shown in FIG. 7) and pointed to by another root metadata DS J. Accordingly, then at the third point in time, illustrated for filesystem block 704(3), the reference count may be increased to 9. The reference count of filesystem block 704 may continue to be increased or decreased depending on the number of root metadata DSs (or intermediate metadata DSs—not shown in FIG. 7) that point to the file data contained in the filesystem block 704.

Figure 8:
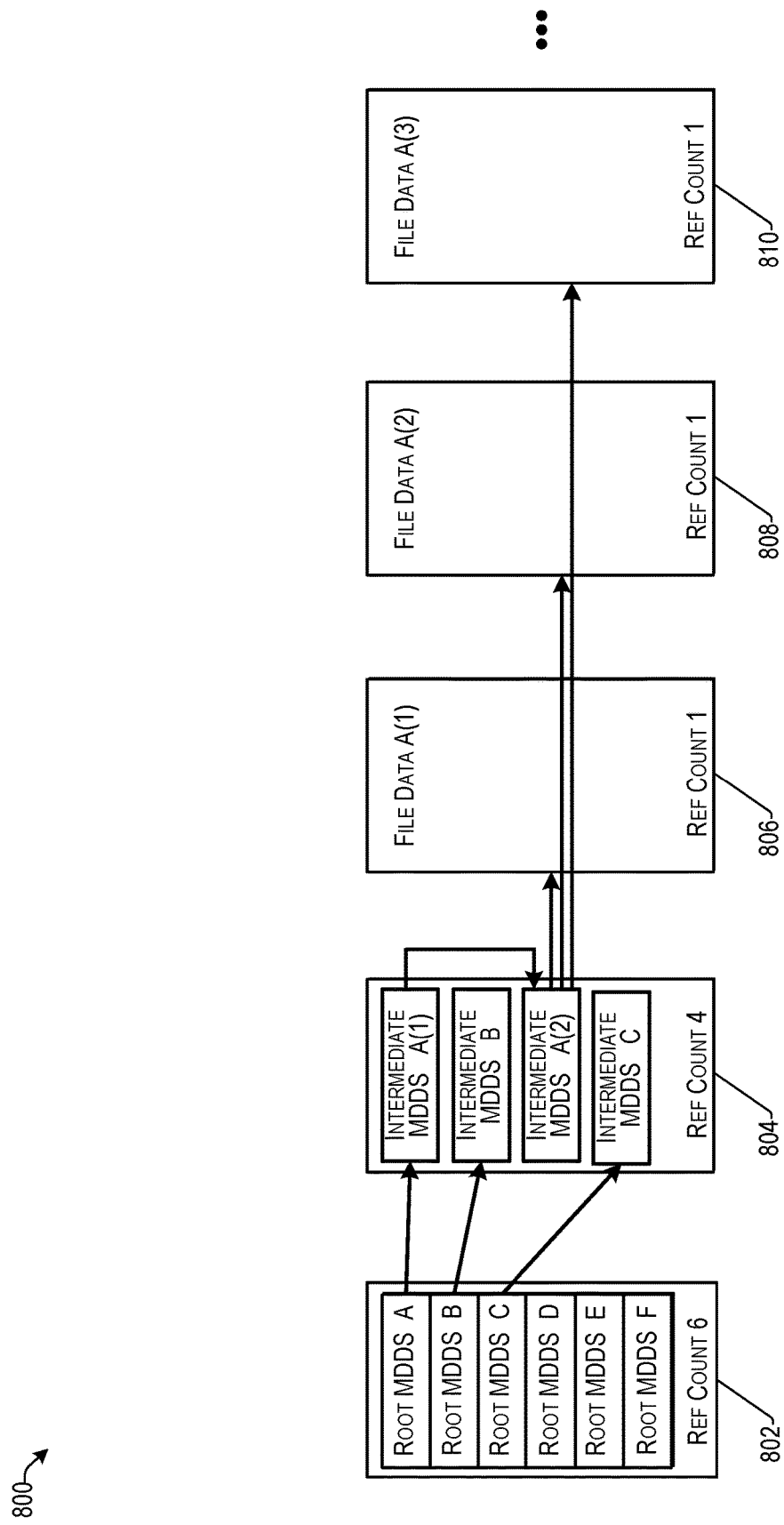
FIG. 8 illustrates an example of conserving storage capacity based on grouping of stored data according to some implementations.

FIG. 8 illustrates an example 800 of conserving storage capacity based on grouping of stored data according to some implementations. In FIG. 8, filesystem block 802 has six root metadata DSs A-F grouped together for six different file data A-F, with only a portion of the file data A for object A being illustrated in this example. In particular, in this example, suppose that the file data A for object A is larger than three filesystem blocks and, accordingly, the first three portions of file data A are illustrated as being contained in filesystem blocks 806, 808, 810, respectively. In particular, file data A(1) is stored in filesystem block 806, file data A(2) is stored in filesystem block 808, and file data A(3) is stored in filesystem block 810, and so forth.

In addition, in this example, a plurality of intermediate metadata data structures are stored together in group intermediate metadata DS filesystem block 804. By grouping the intermediate metadata DSs with other intermediate metadata DSs, no space would be wasted by the intermediate metadata DSs once they completely fill the group filesystem block 804, provided that the fixed filesystem block size is a multiple of the intermediate metadata DS size. In this example, suppose that root metadata DS A stored in block 802 points to intermediate metadata DS A(1) stored in block 804. Similarly, root metadata DS B stored in block 802 points to intermediate metadata DS B stored in block 804, and root metadata DS C stored in block 802 points to intermediate metadata DS C stored in block 804. In addition, in this example, the intermediate metadata DS A(1) points to another intermediate metadata DS A(2) also stored in block 804. The intermediate metadata DS A(2) points to file data A(1) stored in filesystem block 806, file data A(2) in filesystem block 808, and file data A(3) in filesystem block 810. Accordingly, the intermediate metadata DS A(1) is an indirect metadata DS, while the intermediate metadata DS A(2) is a direct metadata DS, e.g., as discussed above with respect to FIG. 2.

As one example, suppose that when the object A was initially stored, the intermediate metadata DS a(1) may have initially pointed to file data A(1), A(2), A(3), . . . , but as additional data was added to object A, intermediate metadata DS A(2) was added to point to the data blocks 806-810 with file data A(1), A(2), A(3), . . . , and intermediate metadata data structure A(1) was changed to reference intermediate metadata data structure A(2) rather than the data blocks 806, 808, 810 . . . .

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system configured to conserve storage capacity, the system comprising:
at least one computing device including one or more processors configured to perform operations for storing file data and metadata for the file data, the metadata including root metadata data structures (DSs), the operations comprising:
storing a plurality of root metadata DSs together in a group root metadata DS filesystem block of a filesystem, the plurality of root metadata DSs including a first root metadata DS;
determining that a first file including first file data referenced by the first root metadata DS and a second file including second file data referenced by a second root metadata DS are smaller than a threshold file size;
based on the first file and the second file being smaller than the threshold size, storing, in a same first data filesystem block of the filesystem, at least the first file data referenced by the first root metadata DS and the second file data referenced by a second root metadata DS, the second root metadata DS stored in the group root metadata DS or another group root metadata DS;
determining a reference count of the first data filesystem block based at least on the first file data referenced by the first root metadata DS and the second file data referenced by the second root metadata DS, wherein determining the reference count includes accessing a bitmap corresponding to at least a portion of the filesystem, the bitmap including a plurality of sets of multiple bits, wherein a respective set of multiple bits corresponds to a respective data file system block, wherein the respective set of multiple bits indicates how many data files smaller than the threshold file size are stored in the corresponding respective data filesystem block;
determining a third file data having content that matches content of the first file data, the third file data referenced by a third root metadata DS;
performing deduplication by updating the third root metadata DS to reference the first file data instead of the third file data; and
updating the reference count of the first data filesystem block based on updating the third root metadata DS.

2. The system as recited in claim 1, the operations further comprising:

when storing a new root metadata DS, determining whether the group root metadata DS filesystem block has sufficient storage space for the new root metadata DS;
when the group root metadata DS filesystem block has sufficient storage space, storing the new root metadata DS in the group root metadata DS filesystem block; and
when the group root metadata DS filesystem block has insufficient storage space, storing the new root metadata DS in a new group root metadata DS filesystem block.

3. The system as recited in claim 2, wherein the operation of determining whether the group root metadata DS filesystem block has sufficient storage space for the new root metadata DS comprises accessing the bitmap to determine from a set of multiple bits corresponding to the group root metadata DS filesystem block, a reference count for the corresponding group root metadata DS filesystem block.

4. The system as recited in claim 1, wherein the operations are automatically performed in response to a write request.

5. The system as recited in claim 1, wherein the first root metadata DS and the second root metadata DS are included in the same group root metadata DS filesystem block.

6. The system as recited in claim 1, wherein, when another root metadata DS in another root metadata DS filesystem block references a file data in the first file data filesystem block, the reference count of the first file data filesystem block is incremented in the bitmap.

7. The system as recited in claim 1, further comprising storing intermediate metadata DSs with other intermediate metadata DSs in a group intermediate metadata DS filesystem block.

8. The system as recited in claim 7, the operations further comprising:
when storing a new intermediate metadata DS, determining whether the group intermediate metadata DS filesystem block has sufficient storage space for the intermediate metadata DS;
when the group intermediate metadata DS filesystem block has sufficient storage space, storing the intermediate metadata DS in the existing group intermediate metadata DS filesystem block; and
when the group intermediate metadata DS filesystem block has insufficient storage space, storing the intermediate metadata DS in a new group intermediate metadata DS filesystem block.

9. The system as recited in claim 1, wherein a first intermediate metadata DS in the group intermediate metadata DS filesystem block references a second intermediate metadata DS in the group intermediate metadata DS filesystem block.

10. The system as recited in claim 9, wherein the first intermediate metadata DS is referenced by the respective root metadata DS in the group root metadata DS file system block.

11. The system as recited in claim 10, wherein the second intermediate metadata DS references a data file system block.

12. A method for conserving storage capacity, the method comprising:
storing, by a computing device, a plurality of root metadata DSs together in a group root metadata DS filesystem block of a filesystem, the plurality of root metadata DSs including a first root metadata DS;
determining that a first file including first file data referenced by the first root metadata DS and a second file including second file data referenced by a second root metadata DS are smaller than a threshold file size;

based on the first file and the second file being smaller than the threshold size, storing, in a same first data filesystem block of the filesystem, at least the first file data referenced by the first root metadata DS and the second file data referenced by a second root metadata DS, the second root metadata DS stored in the group root metadata DS or another group root metadata DS;

determining a reference count of the first data filesystem block based at least on the first file data referenced by the first root metadata DS and the second file data referenced by the second root metadata DS, wherein determining the reference count includes accessing a bitmap corresponding to at least a portion of the filesystem, the bitmap including a plurality of sets of multiple bits, wherein a respective set of multiple bits corresponds to a respective data file system block, wherein the respective set of multiple bits indicates how many data files smaller than the threshold file size are stored in the corresponding respective data filesystem block;

determining a third file data having content that matches content of the first file data, the third file data referenced by a third root metadata DS;

performing deduplication by updating the third root metadata DS to reference the first file data; and updating the reference count of the first data filesystem block based on updating the third root metadata DS.

13. The method as recited in claim 12, further comprising:
when storing a new root metadata DS, determining whether the group root metadata DS filesystem block has sufficient storage space for the new root metadata DS;
when the group root metadata DS filesystem block has sufficient storage space, storing the new root metadata DS in the group root metadata DS filesystem block; and
when the group root metadata DS filesystem block has insufficient storage space, storing the new root metadata DS in a new group root metadata DS filesystem block.

14. The method as recited in claim 12, wherein the operations are automatically performed in response to a write request.

15. The method as recited in claim 12, wherein, when another root metadata DS in another root metadata DS filesystem block references a file data in the first file data filesystem block, the reference count of the first file data filesystem block is incremented in the bitmap.

16. The method as recited in claim 12, wherein a first intermediate metadata DS in the group intermediate metadata DS filesystem block references a second intermediate metadata DS in the group intermediate metadata DS filesystem block.

17. One or more non-transitory computer-readable media storing instructions executable by one or more processors to configure the one or more processors to perform operations for conserving storage capacity, the operations comprising:

storing a plurality of root metadata DSs together in a group root metadata DS filesystem block of a filesystem, the plurality of root metadata DSs including a first root metadata DS;

determining that a first file including first file data referenced by the first root metadata DS and a second file including second file data referenced by a second root metadata DS, are smaller than a threshold file size;

based on the first file and the second file being smaller than the threshold size, storing, in a same first data filesystem block of the filesystem, at least the first file data referenced by the first root metadata DS and the second file data referenced by a second root metadata DS the second root metadata DS stored in the group root metadata DS or another group root metadata DS;

determining a reference count of the first data filesystem block based at least on the first file data referenced by the first root metadata DS and the second file data referenced by the second root metadata DS, wherein determining the reference count includes accessing a bitmap corresponding to at least a portion of the filesystem, the bitmap including a plurality of sets of multiple bits, wherein a respective set of multiple bits corresponds to a respective data file system block, wherein the respective set of multiple bits indicates how many data files smaller than the threshold file size are stored in the corresponding respective data filesystem block;

determining a third file data having content that matches content of the first file data, the third file data referenced by a third root metadata DS;

performing deduplication by updating the third root metadata DS to reference the first file data; and updating the reference count of the first data filesystem block based on updating the third root metadata DS.

18. The one or more non-transitory computer-readable media as recited in claim 17, the operations further comprising:
when storing a new root metadata DS, determining whether the group root metadata DS filesystem block has sufficient storage space for the new root metadata DS;
when the group root metadata DS filesystem block has sufficient storage space, storing the new root metadata DS in the group root metadata DS filesystem block; and
when the group root metadata DS filesystem block has insufficient storage space, storing the new root metadata DS in a new group root metadata DS filesystem block.

19. The one or more non-transitory computer-readable media as recited in claim 17, wherein the operations are automatically performed in response to a write request.

20. The one or more non-transitory computer-readable media as recited in claim 17, wherein, when another root metadata DS in another root metadata DS filesystem block references a file data in the first file data filesystem block, the reference count of the first file data filesystem block is incremented in the bitmap.

* * * * *